United States Patent
Schmitt et al.

(10) Patent No.: US 6,759,761 B1
(45) Date of Patent: Jul. 6, 2004

(54) DEVICE FOR AUTOMATICALLY SWITCHING LIGHTING DEVICES IN VEHICLES

(75) Inventors: Patrick Schmitt, Lichtenau (DE); Norbert Hog, Buehl (DE); Bruno Hodapp, Achern-Oensbach (DE); Rainer Pientka, Renchen (DE); Hans Meier, Ottersweier (DE); Henry Blizke, Buehl (DE); Manfred Burkart, Iffezheim (DE)

(73) Assignee: Robert Bosch GmbH, Stuttgart (DE)

( * ) Notice: Subject to any disclaimer, the term of this patent is extended or adjusted under 35 U.S.C. 154(b) by 106 days.

(21) Appl. No.: 09/936,700
(22) PCT Filed: Dec. 5, 2000
(86) PCT No.: PCT/DE00/04334
§ 371 (c)(1),
(2), (4) Date: Feb. 6, 2002
(87) PCT Pub. No.: WO01/51313
PCT Pub. Date: Jul. 19, 2001

(30) Foreign Application Priority Data

Jan. 12, 2000 (DE) .......................................... 100 00 913

(51) Int. Cl.[7] .............................................. B60Q 1/14
(52) U.S. Cl. ..................................... 307/10.8; 307/112
(58) Field of Search ........................... 307/10.8; 315/77, 315/82, 153

(56) References Cited

U.S. PATENT DOCUMENTS

| | | | |
|---|---|---|---|
| 3,879,617 A | * 4/1975 | Faller .......................... 307/10.8 |
| 4,236,099 A | * 11/1980 | Rosenblum ................... 315/83 |
| 4,665,321 A | 5/1987 | Chang | |
| 5,140,233 A | * 8/1992 | Wallrafen ..................... 318/264 |
| 5,426,589 A | 6/1995 | Kitagawa | |
| 5,780,973 A | * 7/1998 | Lively et al. .................. 315/80 |
| 5,909,172 A | * 6/1999 | Ashford ....................... 340/458 |
| 5,998,929 A | * 12/1999 | Bechtel et al. ................ 315/82 |
| 6,191,531 B1 | * 2/2001 | Reime .......................... 315/82 |
| 6,304,035 B1 | * 10/2001 | Loth ............................ 315/82 |

FOREIGN PATENT DOCUMENTS

| | | |
|---|---|---|
| DE | 195 23 262 A1 | 1/1997 |
| DE | 198 18 959 C | 12/1999 |
| EP | 0 753 986 A | 1/1997 |
| FR | 2 559 282 A | 8/1985 |
| WO | 99 50092 A | 10/1999 |

\* cited by examiner

Primary Examiner—Gregory J. Toatley, Jr.
(74) Attorney, Agent, or Firm—Michael J. Striker

(57) ABSTRACT

The device has a sensor device (20) and an evaluation device (30). The sensor device (20) has a global sensor (22), by which the general light intensity in the surroundings of the vehicle is detected nondirectionally, and a directional sensor (24), by which the light intensity is detected directionally in the travel direction of the vehicle. By the evaluation device (30), the signals (S1, S2) of the sensors (22, 24) of the sensor device (20) are compared with threshold values (SE), and if at least one threshold value (SE) is undershot, the lighting devices (10, 12) are switched on. A temperature measuring instrument (32) for detecting the temperature of the sensor device (20) is also provided, which supplies the evaluation device with a signal (ST) about the temperature. In the evaluation device (30), temperature-dependent basic signals (S10, S20) that the sensors (22, 24) generate without light incidence are stored in memory. By means of the evaluation device (30), a correction of the current signals (S1, S2) of the sensors (22, 24) of the sensor device (20) and/or of the threshold mn values (SE) is effected as a function of the basic signals (S10, S20).

7 Claims, 3 Drawing Sheets

US 6,759,761 B1

DEVICE FOR AUTOMATICALLY SWITCHING LIGHTING DEVICES IN VEHICLES

BACKGROUND OF THE INVENTION

The invention is based on a device for automatically switching lighting devices in vehicles.

One such device is known from German Patent Disclosure DE 195 23 262 A1. This device has a sensor device, which detects the light intensity in the surroundings of the vehicle. The sensor device has at least one global sensor, which nondirectionally detects the general light intensity in the surroundings of the vehicle. The sensor device also has a directional sensor, by which the light intensity is detected directionally in the travel direction ahead of the vehicle. An evaluation device is connected to the sensor device, and by means of the evaluation device the signals of the global sensor and the directional sensor of the sensor device are compared with threshold values; if at least one threshold value or both threshold values is undershot, the lighting devices are switched on. By means of the signals of the global sensor, it can be assured that the lighting devices will be turned on as dusk becomes general, and by the signals of the directional sensor, it can be assured that the lighting devices will be turned on before entering a tunnel, for instance. It has been found that with this known device, reliable activation of the lighting devices cannot be achieved under all circumstances, for instance because of a temperature dependency of the sensor device signals.

SUMMARY OF THE INVENTION

The device of the invention for automatically switching lighting devices in vehicles has the advantage over the prior art that even at different temperatures, reliable switching of the lighting devices is achieved.

Upon abrupt changes in brightness, which are problematic in terms of the adaptation of the human eye, it is possible to turn the lighting devices on even at relatively great brightness, thus improving visual conditions. Turning on the lighting devices will occur after a certain travel distance of the vehicle, for instance in good time before entering a tunnel. The switching of the lighting devices can be adapted to weather conditions; if precipitation is present, they are already turned on at greater brightness than under dry conditions. The lighting devices are switched on at greater brightness when the intensity of the precipitation is increasing.

BRIEF DESCRIPTION OF THE DRAWINGS

One exemplary embodiment of the invention is shown in the drawing and described in further detail in the ensuing description.

DETAILED DESCRIPTION OF THE PREFERRED EMBODIMENTS

Figure 1:
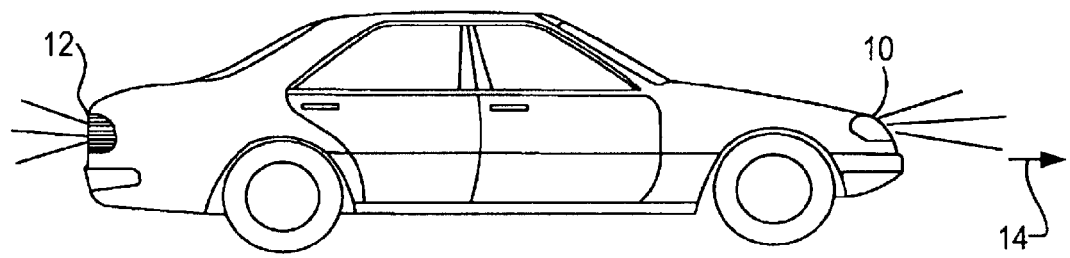
FIG. 1 shows a vehicle with lighting devices and with a device for automatically switching the lighting devices.

FIG. 1 in highly simplified form shows a vehicle, in particular a motor vehicle, which is provided with lighting devices, which among other elements include headlights 10 disposed on the front of the vehicle and tail lights 12 disposed at the back of the vehicle. The headlights 10 can be purely low-beam headlights or combined low- and high-beam headlights that can be switched between their two operating positions. For automatically switching the lighting devices, that is, the low beam of the headlights 10 and the tail lights 12, a device is provided which is disposed on the vehicle.

Figure 2:
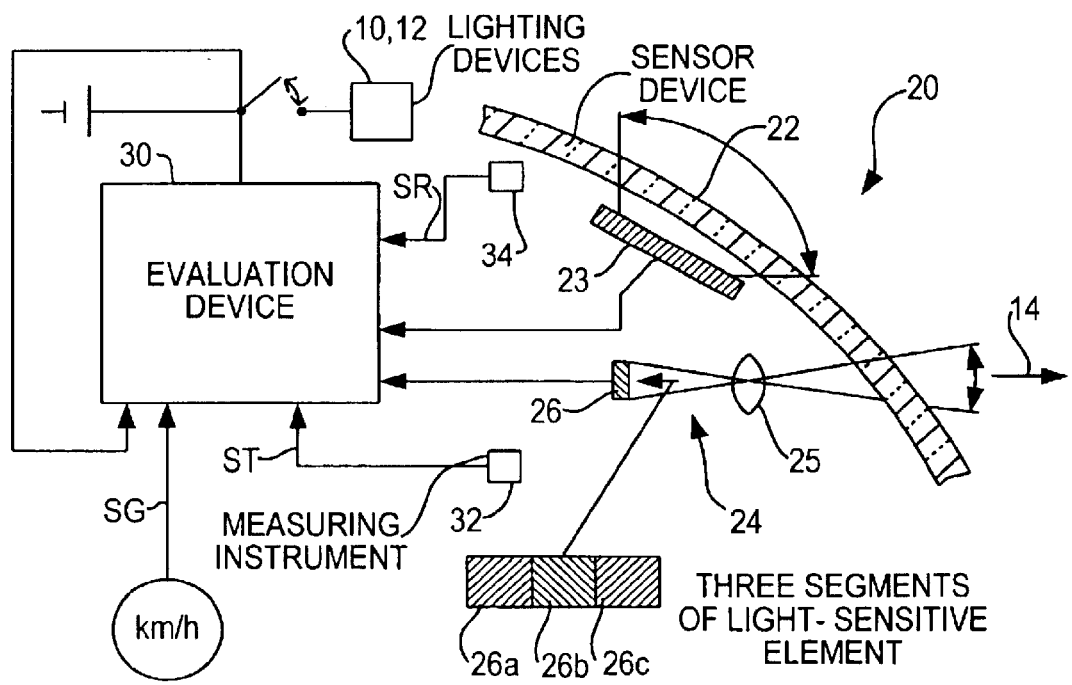
FIG. 2, in a simplified view, shows the device for automatically switching the lighting devices.

This device, shown in simplified form in FIG. 2, includes a sensor device 20 and an evaluation device 30 connected to it. The sensor device 20 is disposed at the front of the vehicle and can for instance be integrated with one of the headlights 10 or disposed separately from the headlights. The sensor device 20 can also be disposed in the passenger compartment of the vehicle, behind the windshield. The sensor device 20 has at least one global sensor 22, by which the light intensity, or in other words the brightness, in the surroundings of the vehicle is detected. This means that by means of the global sensor 22, not only is light striking the sensor device 20 from a certain direction detected, but also light from various directions in the surroundings of the vehicle, that is, the general light intensity, in the surroundings of the vehicle is detected by the global sensor 22. The global sensor 22 has at least one light-sensitive element 23, which as a function of the intensity of the light striking it generates an electrical signal, such as a flow of current or a voltage, which is proportion to the intensity of the incident light and thus to the brightness in the surroundings of the vehicle. The sensor device 20 furthermore has at least one directional sensor 24, which detects only light striking the sensor device 20 from a certain direction. The directional sensor 24 is disposed in such a way that it essentially detects light striking the sensor device 20 counter to the travel direction 14 of the vehicle. The directional sensor 24 can have a projector-type optical element 25, by which light striking the sensor device 20 counter to the travel direction 14 is focused on the directional sensor 24. The directional sensor 24 likewise has at least one light-sensitive element 26, which generates an electrical signal proportional to the intensity of the incident light. In the case of the directional sensor 24, the light-sensitive element can be subdivided into a plurality of segments, or a plurality of light-sensitive elements can be provided, one or more of which each form one segment, and light from various directions strikes the segments. For instance, a subdivision into three segments 26a, b, c can be provided, in which light coming from the region of the left edge of the road ahead of the vehicle strikes a first segment 26a, light from a middle region of the road strikes a second segment 26b, and light from the region of the right-hand edge of the road strikes a third segment 26c.

The signals of the sensor device 20, that is, of the global sensor 22 and of the directional sensor 24, are delivered to the evaluation device 30. The evaluation device 30 also receives a signal pertaining to the switching state of the lighting devices 10, 12, that is, a signal that says whether these are on or off. In the evaluation device 30, by processing of the signals of the sensor device 20 taking the switching state of the lighting devices 10, 12 into account, it is ascertained whether, given the currently prevailing light intensities in the surroundings of the vehicle, any change in the switching state of the lighting devices is needed, and in particular whether, in conditions of inadequate brightness, the lighting devices must be turned on.

By means of the evaluation device 30, the signals of the sensor device 20, that is, a signal from its global sensor 22 and a signal from its directional sensor 24, are each compared with a respective threshold value, and if either threshold value is undershot the lighting devices 10, 12 are turned on. These threshold values can be stored in memory in the evaluation device 30, or else they can be ascertained by the evaluation device as a function of one or more parameters to be explained hereinafter. Two threshold values SE and SA are present for the signals of the sensor device 20, with the threshold values SE being higher than the threshold values SA. The lighting devices 10, 12 are turned on if the signal of the global sensor 22 and/or the signal of the directional sensor 24 undershoots the associated threshold value SE. The lighting devices 10, 12 are not switched off until both the signal of the global sensor 22 and the signal of the directional sensor 24 undershoot the associated threshold value SA. As a result of this hysteresis function, it is attained that the lighting devices 10, 12 are not constantly switched on and off again if the signals of the sensor device 20 are fluctuating around the associated threshold values SE.

Figure 3:
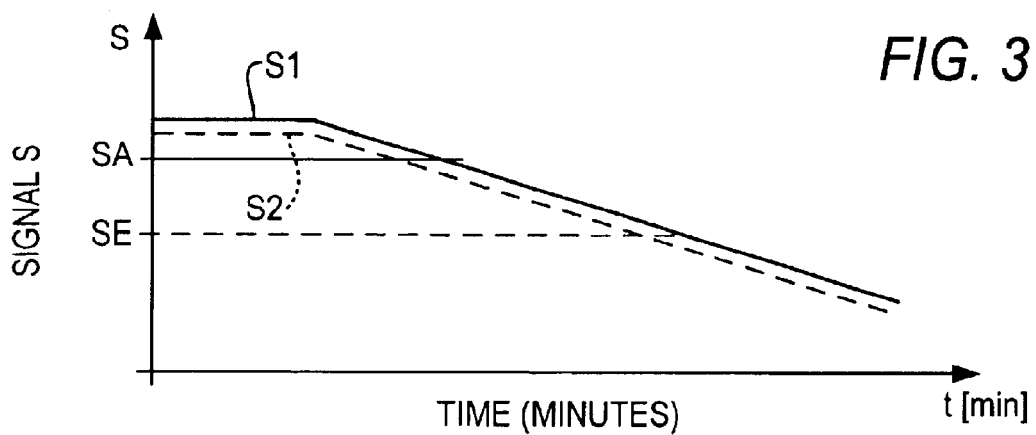
FIG. 3 shows a course of signals of a sensor device of the device for automatically switching the lighting devices, with a slow signal change.

From the signal of the global sensor 22 of the sensor device 20, a gradual, slow change in the general light intensity in the surroundings of the vehicle, for instance during twilight, can be detected by the evaluation device 30, so that the lighting devices 10, 12 can be turned on in good time and turned off again if the light intensity is increasing. In FIG. 3, the course over time of the signals S1 of the global sensor 22 and the signals S2 of the directional sensor 24 of the sensor device 20 for a gradually decreasing light intensity are shown.

Figure 4:
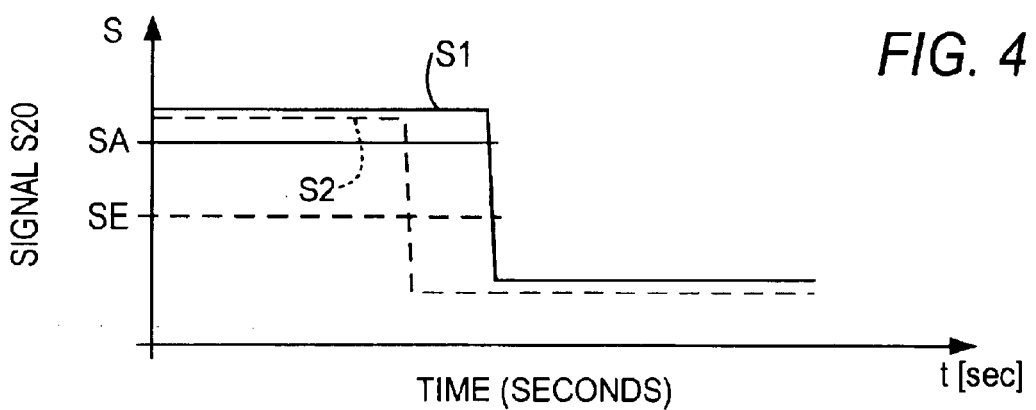
FIG. 4 shows the course of the signals of the sensor device with a rapid signal change.

From the drop in the signal of the directional sensor 24, dark stretches of road ahead of the vehicle in the travel direction 14 can be detected by the evaluation device 30. Dark stretches of road can for instance be a tunnel, an underpass, or a wooded area located ahead of the vehicle in the travel direction 14. By means of the evaluation device, the lighting devices can be turned on in good time before the dark stretch of road is reached. In FIG. 4, the course over time of the signals S1 of the global sensor 22 and the signals S2 of the directional sensor 24 of the sensor device 20 are shown where a dark stretch of road is being approached. From the decreasing signal S2 of the directional sensor 24, the dark stretch of road can already be detected early, while the signal S1 of the global sensor 22 does not drop until upon entrance into the dark stretch of road.

Figure 5:
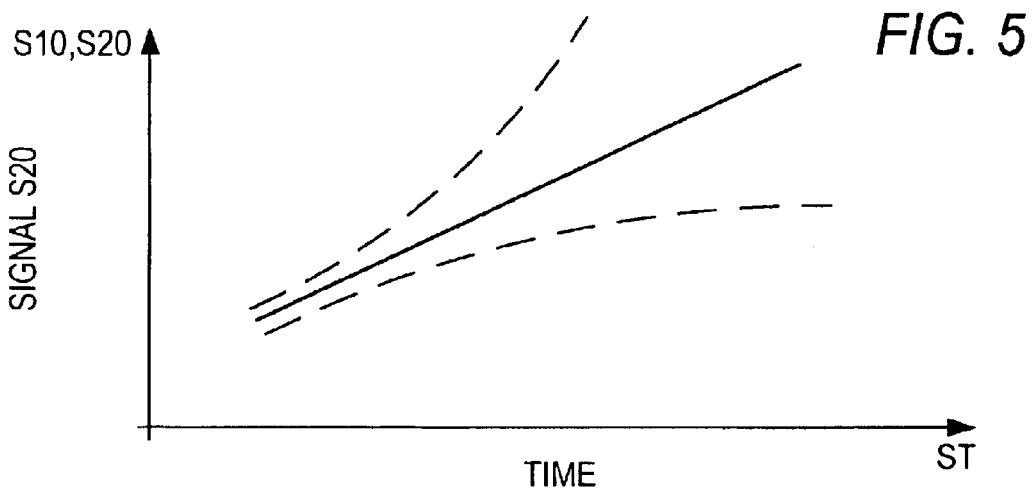
FIG. 5 shows a temperature-dependent correction of the signals of the sensor device.

The signals S1, S2 of the global sensor 22 and directional sensor 24 of the sensor device 20 are dependent on the temperature of the sensor device 20. To compensate for this temperature dependency of the signals S1, S2, a temperature measuring instrument 32 is provided, by which preferably the temperature of the sensor device 20 is detected. Alternatively, the temperature measuring instrument 32 can be disposed at a distance from the sensor device 20, but in that case it must be connected to the evaluation device 30. A signal ST for the temperature of the sensor device 20 is supplied to the evaluation device 30 by the temperature measuring instrument 32. Temperature-dependent basic signals S10, S20 for the global sensor 22 and the directional sensor 24 that these sensors generate without any incidence of light are stored in memory in the evaluation device 30. Thus one basic signal S10 and S20 for various temperatures is stored in the evaluation device 30 for the global sensor 22 and the directional sensor 24, respectively. The actual signals S1 and S2 of the global sensor 22 and the directional sensor 24 are corrected by the evaluation device 30 as a function of temperature by means of the respective basic signal S10 and S20, so that in each case a reliable signal S1, S2, not adulterated by the temperature, is present that is compared by the evaluation device 30 with the threshold values SE and SA. Alternatively, it can be provided not that the signals S1 and S2 of the sensor device 20 are corrected as a function of temperature, but rather that the threshold values SE and SA are corrected with the respective temperature-dependent basic signal S10 and S20. In FIG. 5, the dependency of the basic signals S10, S20 on the temperature is shown. As represented by a solid line in FIG. 5, there can be a linear dependency of the basic signals S10, S20 on the temperature, or some arbitrary other dependency thereof, as indicated by dashed lines.

Figure 6:
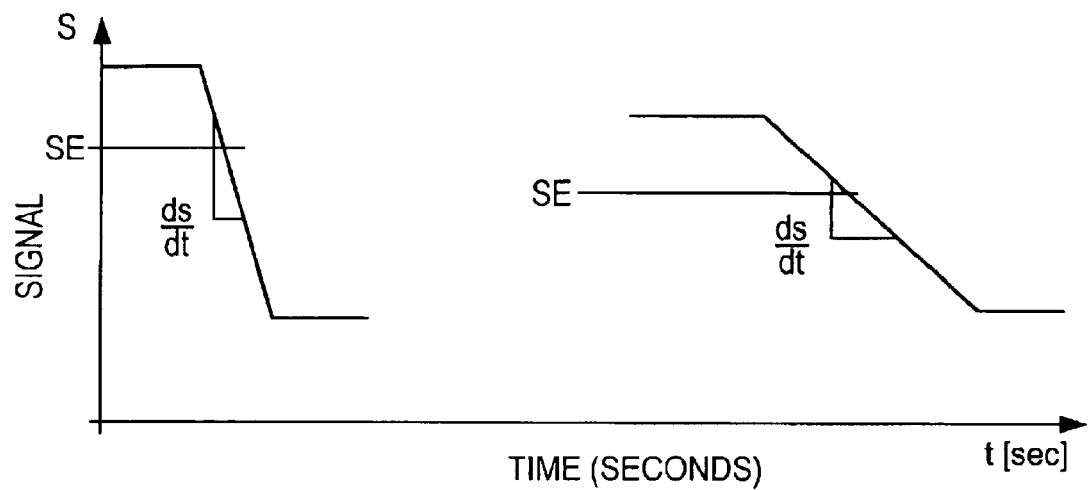
FIG. 6 shows a variation in threshold values as a function of a rate of change.

In a refinement of the device, it is provided that by means of the evaluation device 30, not only the absolute values of the signals S1 and S2 of the sensor device 20 are processed, but also the change over time dS/dt of the signals S1 and S2, that is, their rate of change. The processing of the signals S1 and S2 of the sensor device 20 by the evaluation device 30 is preferably done in clocked fashion, in which the change over time and thus the rate of change of the signals S1 and S2 is ascertained from successive processing operations. The threshold values SE and/or SA are varied as a function of the rate of change of the signals S1 and S2, in such a way that at a high rate of change, the threshold values SE and/or SA are elevated. This means that at a high rate of change of the signals S1 and S2, the lighting devices 10, 12 are already turned on while the light intensity is still relatively high, while at a low rate of change, the lighting devices 10, 12 are not turned on until the light intensity is low. As a result, an adaptation to the adaptability of the human eye to different light intensities is attained, since when the light intensity decreases rapidly, the eye adapts more poorly than when there is a slow decrease in the light intensity. In FIG. 6, the left-hand portion shows a variation of the signals S1, S2 at a low rate of change dS/dt, at which the threshold values SE in and/or SA are elevated only slightly if at all. The right hand part of FIG. 6 shows a variation of the signals S1, S2 with a high rate of change dS/dt, at which there is an elevation or a more pronounced elevation of the threshold values SE and/or SA.

Provision can also be made so that the threshold values SE and/or SA can be varied by the evaluation device 30 as a function of the absolute value of the signals S1 and/or S2. The threshold values SE and/or SA are then varied in such a way that when the signal S1, S2 is dropping from an originally high signal, the threshold values SE and/or SA are higher than for a signal S1, S2 that is decreasing from an originally low signal. This means that for a signal S1, S2 decreasing from an originally high signal, the lighting devices 10, 12 are already turned off while the light intensity is still relatively high, and when the signal S1, S2 is decreasing from an originally slight signal, the lighting devices 10, 12 are not turned off until the light intensity is lower. Once again, this achieves an adaptation to the adaptability of the human eye to different light intensities, since from an originally high light intensity the eye adapts more poorly to a lower light intensity than when the original light intensity was lower. In FIG. 6, the left-hand part shows a drop in the signal S1, S2 from a high value; hence in that case an elevation of the threshold values SE and/or SA is effected. In the right-hand part of FIG. 6, the drop in the signal S1, S2 has begun from a lower value, so that here no elevation or only a lesser elevation of the threshold values SE and/or SA takes place.

As already indicated above, the processing of the signals S1, S2 of the sensor device 20 by the evaluation device 30 is preferably done in clocked fashion. In a refinement of the device, it is provided that the evaluation device 30 is additionally supplied with a signal SG for the current speed of the vehicle. This speed signal SG can be derived from the vehicle speedometer, for instance. The clock frequency with which the processing of the signals S1, S2 of the sensor device 20 is effected by the evaluation device 30 is varied as a function of the current speed of the vehicle, in such a way that at a high speed, the processing takes place at a higher clock frequency than at a low speed. It can be provided that with increasing speed, the clock frequency of the processing is increased. In particular, the increase in the clock frequency can be made proportional to the increase in speed, such that the distance the vehicle covers during the duration of one cycle is at least approximately constant. As a result, it is attained that the lighting devices 10, 12 are switched on after a certain travel distance, regardless of the speed, and thus are reliably turned on in good time before entering a dark stretch of road, for instance.

Figure 7:
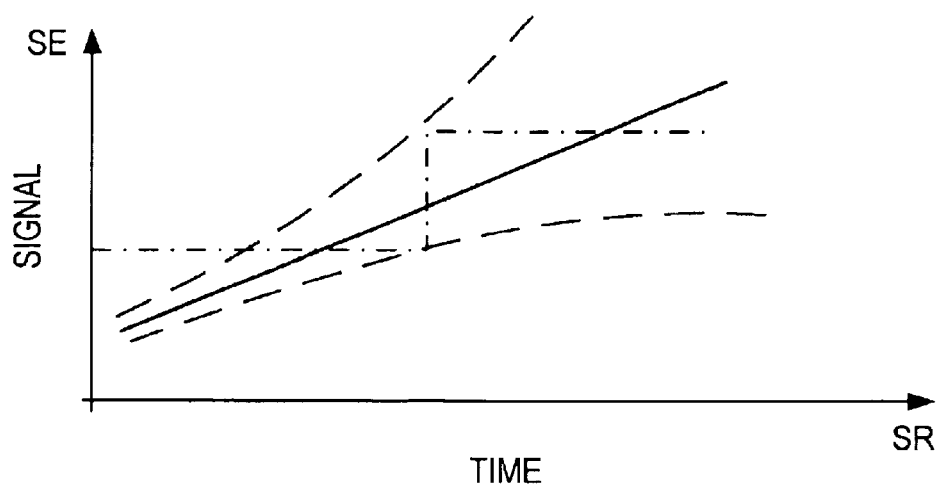
FIG. 7 shows a variation of threshold values as a function of weather.

In a refinement of the invention, it is provided that the threshold values SE and/or SA are varied as a function of weather conditions, a distinction being made between dry weather and precipitation. To detect the weather conditions, a rain sensor 34 can preferably be used, which detects the precipitation striking the vehicle windshield and as a function thereof controls the operation of the vehicle windshield wipers. The evaluation device 30 can be supplied directly with a signal SR from the rain sensor 34 or with a signal SR derived from the operation of the windshield wipers. It can be provided that the signal SR that is processed by the evaluation device 30 assumes only two different values, that is, one for dry weather and one in the presence of precipitation. In that case, the evaluation device 30 sets the threshold values SE and/or SA higher when precipitation is present than in dry weather. This means that when precipitation is occurring, the lighting devices 10, 12 are turned on sooner, at a higher light intensity than in dry weather. Provision can also be made so that the signal SR, which is processed by the evaluation device 30, assumes a value dependent on the intensity of the precipitation. The signal SR can then also depend on the speed of the windshield wipers and for instance can assume different values when the windshield wipers are in the intermittent mode or in an operating mode at a first or second or higher speed. By means of the evaluation device 30, the threshold values SE and/or SA are then raised as a function of the signal SR with increasing intensity of precipitation or with increasing speed of the windshield wipers, so that as the intensity of the precipitation increases, the lighting devices 10, 12 are already turned on at a higher light intensity. In FIG. 7, the dependency of the threshold values SE and/or SA on the signal SR is shown, which can be linear, as indicated by the solid line, or arbitrarily otherwise, as represented by dashed lines. It is also possible merely to switch between two or more defined threshold values, as represented by the dot-dashed line.

What is claimed is:

1. A device for automatically switching lighting devices in a vehicles, comprising,
   a sensor device (20) for detecting the light intensity in surroundings of the vehicle;
   at least one global sensor (22) provided in the sensor device for nondirectonally detecting the general light intensity in the surroundings of the vehicle;
   at least one directional sensor (24) provided in the at least one global sensor for directionally detecting the light intensity at least approximately in the travel direction (14) of the vehicle;
   an evaluation device (30) for comparing the current signals (S1, S2) of the sensors (22, 24) of the sensor device (20) with threshold values (SE), wherein if at least one of the threshold values (SE) is undershot, the lighting devices (10, 12) are switched on,
   wherein at least indirectly, the current temperature of the sensor device (20) is detected and a signal (ST) pertaining to the current temperature is delivered to the evaluation device (30)
   a memory, wherein in the evaluation device (30), temperature-dependent basic signals (S10, S20) of the sensors (22, 24) of the sensor device (20) are stored in the memory without incidence of light, and wherein by means of the evaluation device (30), a correction of the current signals (S1, S2) of the sensors (22, 24) of the sensor device (20) and/or of the threshold values (SE) is effected in accordance with the basic signals (S10, S20).

2. The device of claim 1, wherein by means of the evaluation device (30), a rate of change (dS/dt) of the signals (S2, S2) of the sensor device (20) are ascertained, and wherein the threshold values (SE) are varied as a function of the rate of change (dS/dt) of the signals (S1, S2), in such a way that at a high rate of change (dS/dt), the threshold values (SE) are higher than at a low rate of change (dS/dt).

3. The device of claim 1, wherein by means of the evaluation device (30), the threshold values (SE) are varied as a function of the absolute values of the signals (S1, S2) of the sensor device (20), in such a way that for a signal (S1, S2) that is decreasing from a high absolute value, the threshold values (SE) are higher than for a signal (S1, S2) that is decreasing from a low absolute value.

4. The device of claim 1, wherein the evaluation device (30) is supplied with a signal (SG) for a current speed of the vehicle, and wherein the processing of the signals (S1, S2) of the sensors (22, 24) of the sensor device (20) by the evaluation device (30) is effected in clocked fashion as a function of the speed of the vehicle, in such a manner that the processing at high speed is done at a higher dock frequency than at low speed.

5. The device of claim 4, wherein the clock frequency is varied as a function of the speed in such a way that a distance the vehicle covers between successive processing cycles is approximately constant.

6. The device of claim 1, wherein a further sensor device (34) for detecting precipitation is provided, wherein a signal (SR) is generated at least indirectly by said further sensor device and delivered to the evaluation device (30), and wherein by the evaluation device (30), a variation in the threshold values (SE) is effected in such a manner that the threshold values (SE) are higher when precipitation is present than when precipitation is absent.

7. The device of claim 6, wherein the signal (SR) generated at least indirectly by the further sensor device (34) is dependent on the intensity of the precipitation, and wherein by means of the evaluation device (30), a variation in the threshold values (SE) is effected in such a manner that the threshold values (SE) are higher at high intensity of the precipitation than at low intensity of the precipitation.

* * * * *